(12) United States Patent  
Choate

(10) Patent No.: US 6,338,399 B1  
(45) Date of Patent: Jan. 15, 2002

(54) ENERGY ABSORPTION DEVICE FOR FALL ARREST SYSTEMS

(76) Inventor: Gary E. Choate, 747 Sheridan Blvd., Unit 8B, Denver, CO (US) 80214

( * ) Notice: Subject to any disclaimer, the term of this patent is extended or adjusted under 35 U.S.C. 154(b) by 0 days.

(21) Appl. No.: 09/283,698

(22) Filed: Apr. 1, 1999

Related U.S. Application Data

(60) Provisional application No. 60/080,409, filed on Apr. 2, 1998, now abandoned.

(51) Int. Cl.[7] .................................................. F16F 7/12
(52) U.S. Cl. ........................................ 188/374; 280/777
(58) Field of Search ................................ 188/374, 371; 74/492; 280/777

(56) References Cited

U.S. PATENT DOCUMENTS

| | | | | |
|---|---|---|---|---|
| 3,026,972 A | * | 3/1962 | Hendry et al. | 188/1 |
| 3,186,664 A | * | 6/1965 | Schultz | 188/371 |
| 3,398,812 A | * | 8/1968 | Peterson | 188/371 |
| 3,532,379 A | * | 10/1970 | Reilly et al. | 297/216 |
| 3,680,913 A | * | 8/1972 | Seybold | 297/386 |
| 3,717,224 A | * | 2/1973 | Leach et al. | 188/1 C |
| 3,752,462 A | * | 8/1973 | Wight, Jr. | 188/371 |
| 3,847,252 A | * | 11/1974 | Casciola | 188/1 C |
| 4,275,802 A | | 6/1981 | de Groot et al. | |
| 4,396,096 A | | 8/1983 | de Groot et al. | |
| 5,035,307 A | * | 7/1991 | Sadeghi et al. | 188/372 |
| 5,118,214 A | * | 6/1992 | Petrzelka et al. | 403/267 |
| 5,154,262 A | * | 10/1992 | Berwanger | 188/196 R |
| 5,235,734 A | * | 8/1993 | DuRocher et al. | 29/455.1 |
| 5,423,400 A | | 6/1995 | Wesselski | |
| 5,433,290 A | | 7/1995 | Ellis et al. | |
| 5,458,221 A | * | 10/1995 | Flux et al. | 188/374 |
| 5,598,900 A | | 2/1997 | O'Rourke | |
| 5,623,756 A | * | 4/1997 | Yanagidate et al. | 29/525 |
| 6,099,037 A | * | 8/2000 | Korzan | 280/777 |

* cited by examiner

Primary Examiner—Robert J. Oberleitner
Assistant Examiner—Benjamin A. Pezzlo
(74) Attorney, Agent, or Firm—Ramon L. Pizarro; Edwin H. Crabtree

(57) ABSTRACT

An energy absorption device is disclosed for use both as in-line and horizontal life line shock or energy absorbers for fall arrest systems. The device includes a sleeve through which a bolt head is drawn. The bolt head compresses from the interior surface of the sleeve and thus absorbs energy as the device is stretched during a fall.

12 Claims, 3 Drawing Sheets

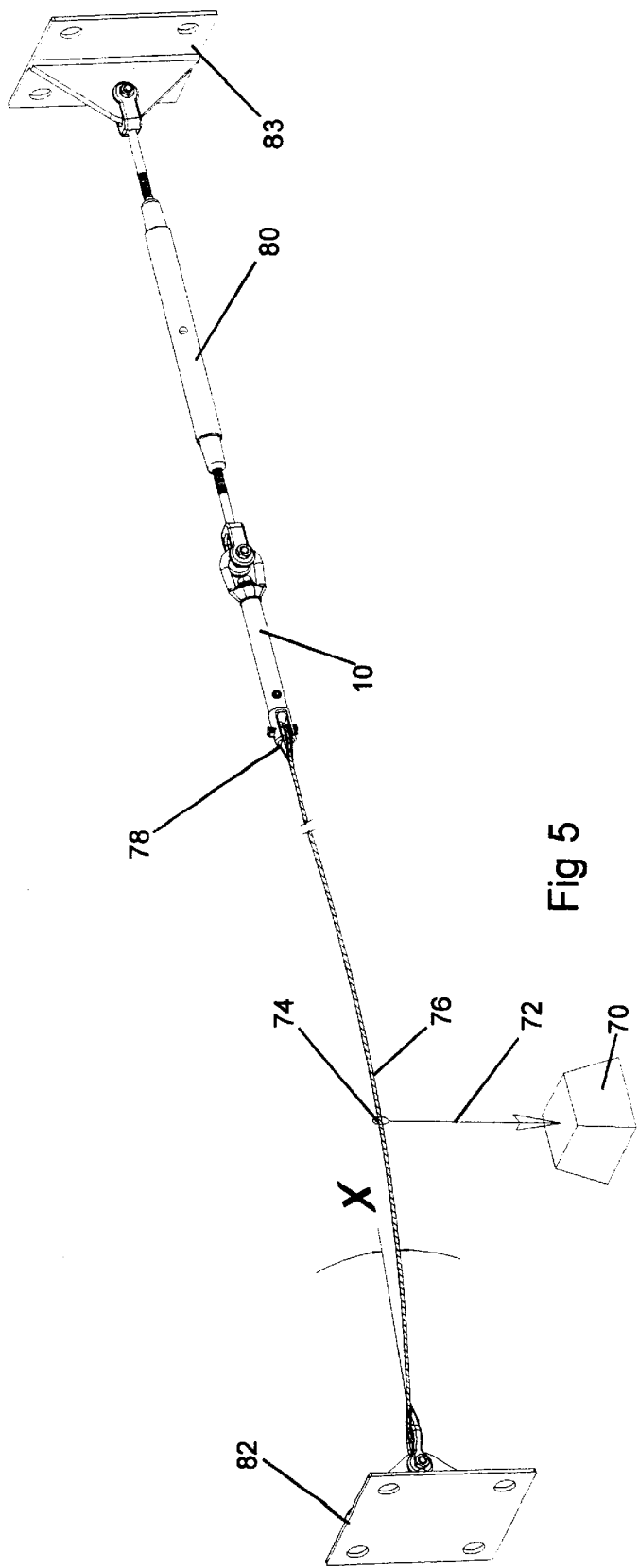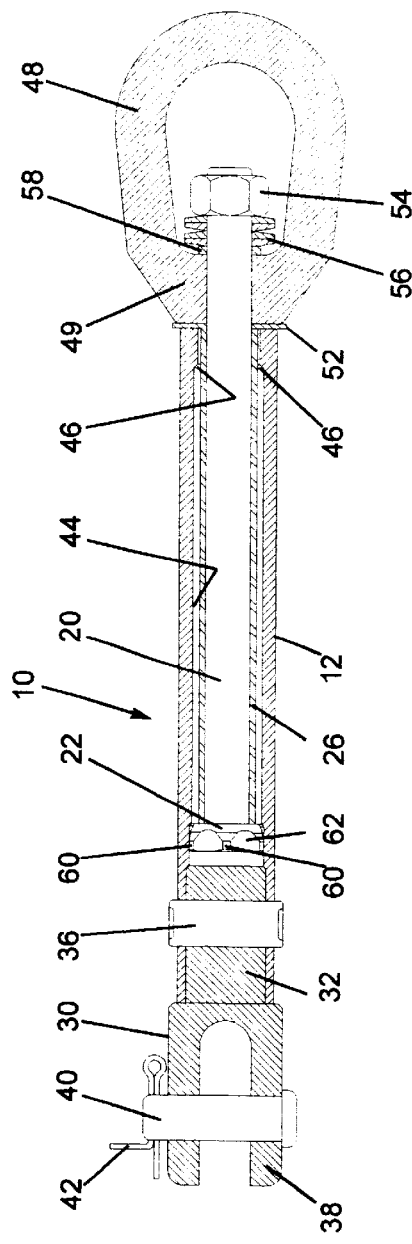

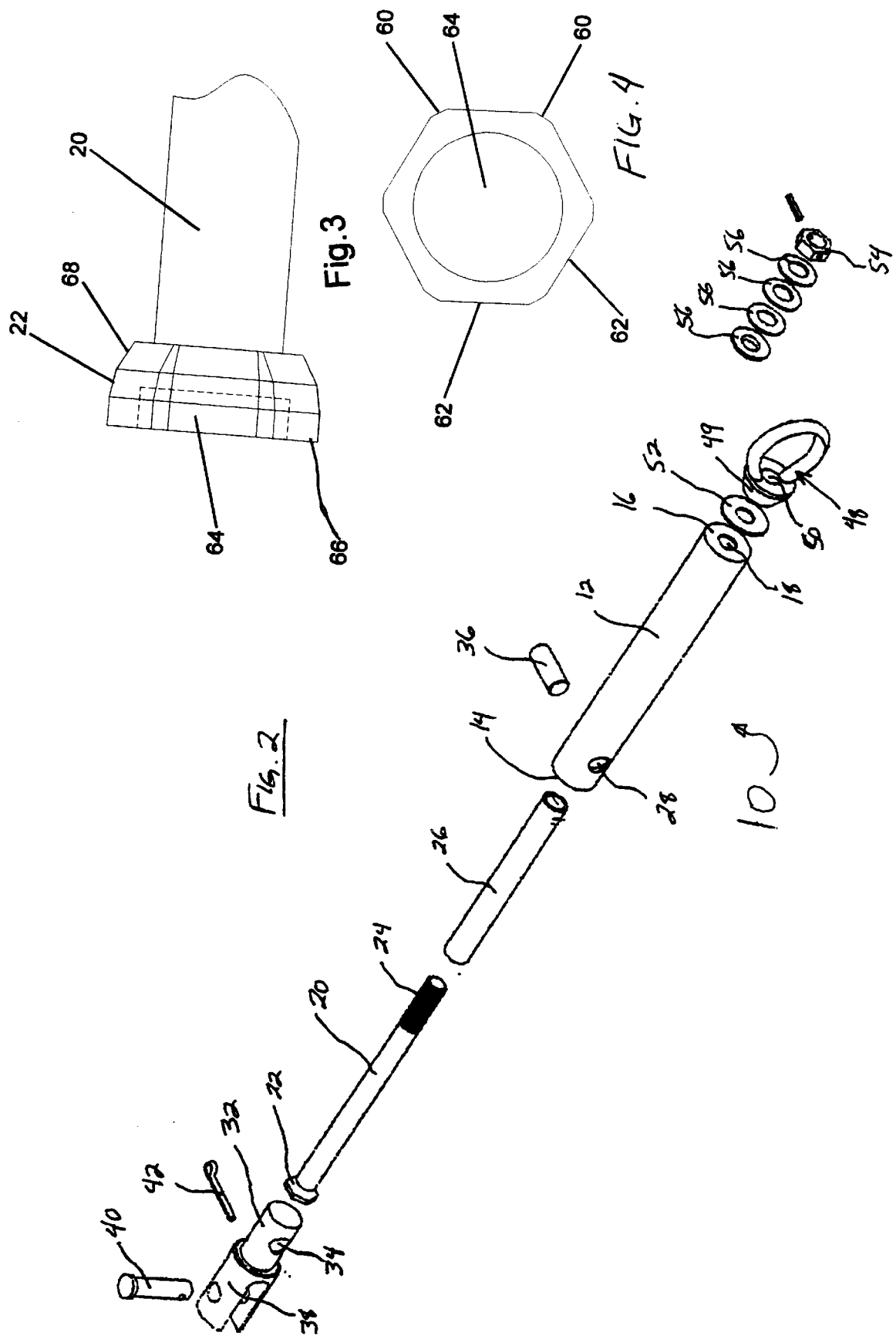

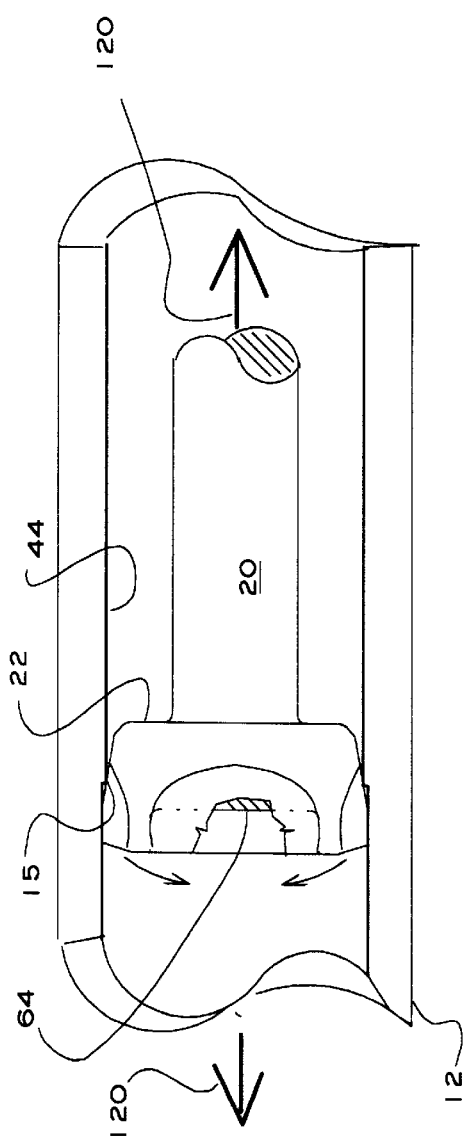
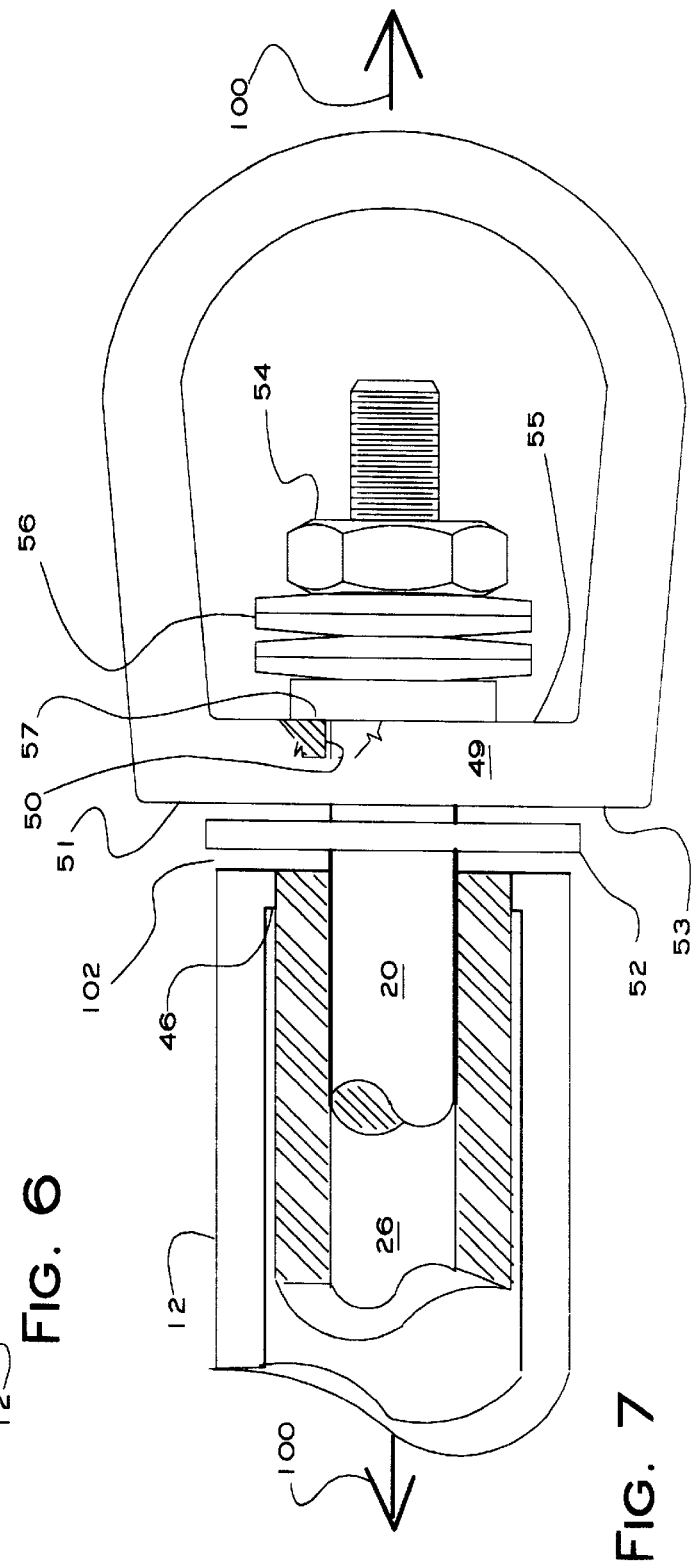
FIG. 6
FIG. 7

ENERGY ABSORPTION DEVICE FOR FALL ARREST SYSTEMS

REFERENCE TO RELATED APPLICATIONS

This application is a continuation of, and claims the benefit of, my provisional application having Ser. No. 60/080,409, filed Apr. 2, 1998, now abandoned.

BACKGROUND a) Field of the Invention

This invention relates generally to fall protection devices and, more particularly, to energy absorbing devices for use in fall arrest systems. Specifically, the present invention relates to both in-line as well as horizontal life line energy absorbing devices.

B) Description of Known Art

Fall protection and safety equipment are utilized in situations which require an individual to be suspended from an elevated position for a variety of reasons, such as for work at a location below that point. In addition, such equipment is generally used in other situations such as rescue operations, mountain climbing and in numerous other applications where an individual's entire body must be supported. Such equipment can include harnesses, safety hoists and the like.

One particular type of such fall protection equipment also includes shock absorbers or energy absorbers. Such shock absorbers or energy absorption devices can be utilized in line with the individual's support cable or in conjunction with horizontal life lines. The purpose of such energy absorption devices is to control the line tension created in horizontal life lines or vertical support lines in personnel fall arrest.

For example, horizontal life lines are particularly useful in certain applications for fall arrest because they do not require a rigid structural support over the work area, but rather can be supported by structure at each end of the work area, such as vertical I-beams at each end of an open flooring or canyon walls on each end of a bridge. The shock absorber performs four main functions within the horizontal lifeline system. First, it adds hysterisis to the system; second, it adds energy capacity to the system; third, it elongates the line to decrease low sag angle load amplifications and, fourth, it can be used to "tune" a Horizontal Lifeline to cause the line to absorb energy at a higher rate, thus decreasing both, input energy and total fall distance. Perhaps the most important feature about the design of a Horizontal Lifeline shock absorber is that it must elongate at a high enough force such that it does not allow the falling weight to accelerate and gain input energy any longer than necessary in the fall cycle. In other words, it must provide sufficient initial line tension to reverse the force vector of the falling weight by causing the upward force due to line tension to be equal to the falling weight. If one does not allow unnecessary energy to enter into the system at the beginning of a fall cycle, it will not be necessary to take the energy out at the end. For this reason shock absorbers are designed to work with specific types of cable as compatible components and no substitutions can be made.

There are a number of devices that are designed to be shock or energy absorbers of the type described above. Such devices are disclosed in U.S. Pat. No. 5,598,900, No. 5,423,400, No. 5,433,290, No. 4,396,096 and No. 4,275, 802. Such devices are designed to absorb energy while elongated during a fall arrest. A problem with certain of these devices is that they are large, cumbersome, and due to their design, are prone to malfunction by jamming, for instance. Moreover, they do not absorb sufficient energy at the beginning of the fall cycle to significantly reduce final line tension. In addition, some such prior devices do not permit the installer of the fall arrest system to pretension or tune the cable to operate in the correct force versus elongation range. Consequently, the distance a person falls during a fall arrest can be greatly increased. Thus, there remains a need for an energy absorbing device for use with in-line or horizontal life lines which not only absorb significant amounts of energy but also permit high level pretensioning of the fall arrest system to reduce the energy allowed to input into the system at the beginning of the fall cycle. The importance of this feature and need is that the quicker in a fall cycle that a falling weight is decelerated, the lower the total energy input and the lower the resultant line tension at the end of the fall arrest cycle.

The importance of the need to start the energy absorption as early as possible in the fall cycle can be understood by reflecting on the fact that the amount of kinetic energy gained by a falling body continuously increases until the body in motion begins to decelerate. Therefore, in order to minimize the amount of energy needed to stop the fall of a person, for example, it is imperative that a significant decelerating force be applied as soon as the fall begins. Accordingly, in systems where the fall of a person is to be decelerated by means of a horizontal lifeline, it is important to take into consideration the elastic and energy retention properties of the cable being used at the horizontal lifeline. Most cables used as horizontal lifelines exhibit highly elastic deformation when resisting the load imposed by a falling person. This elastic deformation is detrimental to the safe deceleration of the falling individual since the elastic deformation simply stores the energy of the fall, and then returns the energy in the form of rebound energy. This rebound can create forces as high as 90% of the initial fall, greatly increasing the chance of injury to the falling worker.

The force needed to stretch an elastic element-such as an elastic horizontal lifeline is proportional to the spring constant of the lifeline times the amount of distance of stretch already imposed on the elastic element. Therefore, to quickly remove fall energy by means of the horizontal lifeline, it is important to pre-load the horizontal lifeline such that additional stretching of the horizontal lifeline will carried out at a much higher energy level than required if the horizontal lifeline had not been pre-loaded. This means that a greater amount of energy is absorbed for a given amount of elastic deformation and loading in the horizontal lifeline. The rapid removal of energy avoids long elastic deformation which in turn reduces the total fall distance and subsequent clearances required.

Still further, the prevention of the rebound action is also assisted by the use of a telescoping energy absorbing shock damper that adds hysterisis to the system. This is a constant force shock absorber that converts all energy into heat while damping the system. A significant problem to be solved by energy absorbing systems that use telescoping components is that these devices use a pair of telescoping components that absorb or use energy by cold working and deforming a section of the components as they move relative to one another. An important limitation with these systems has been that the parts tend to seize against one another while they move relative to one another. Naturally, once the parts seize relative to one another, the safety function of the device is defeated.

SUMMARY

To achieve the foregoing and other objects and in accordance with the purpose of the present invention as embodied and broadly described herein, an energy absorption device is disclosed for use both as in-line and horizontal life line shock or energy absorbers for fall arrest systems. The device includes a hollow metal sleeve through which an internal element with an enlarged portion of reduced stiffness. This enlarged portion with reduced stiffness can be formed, for example, from an angularly-shaped solid element, such as a bolt head. The reduction in the stiffness of the bolt head can be accomplished by boring out the head in order to allow the bolt head to flex in a generally radial manner inwardly as it is pulled through the metal sleeve. The angularly-shaped element is multiple-sided and deforms the interior metal surface of the sleeve, thus converting energy of motion and friction into heat and metal deformation work energy as the device is elongated during a fall. The flex of the bolt head prevents the bolt head from permanently welding itself against the interior of the sleeve as the head is slid through the sleeve. In other words, the flexing allows the bolt head to break free the instant any welding begins to take place. This shock absorber is in essence a flexible hex-shaped inner-tube being pulled through a round rigid outer tube. The friction produced by this pulling converts most if not all of the kinetic energy into heat while providing a constant resistance force, so that the shock absorber absorbs the rebound energy of the cable, damping the system to reduce or eliminate rebound.

DRAWINGS

The accompanying drawings which are incorporated in and form a part of the specification illustrate preferred embodiments of the present invention and, together with a description serve to explain the principles of the invention. In the drawings:

FIG. 1 is a cross-sectional view of one embodiment of the energy absorption device of the present invention;

FIG. 2 is an exploded view of the embodiment of the invention illustrated in FIG. 1;

FIG. 3 is an enlarged, partial perspective view of an embodiment of an interior bolt head utilized with the present invention;

FIG. 4 is a plan view of the bolt head illustrated in FIG. 3; and

FIG. 5 is a schematic illustrating the use of the present invention with a horizontal life line arrangement.

FIG. 6 is an enlarged view taken from FIG. 1.

FIG. 7 illustrates the use function of the tension gaging means.

DETAILED DESCRIPTION OF EXEMPLAR EMBODIMENTS

Referring first to FIGS. 1 and 2, an energy absorption device 10 is illustrated and includes a tubular sleeve 12 having a first open end 14, having an opening 15 near the first end 14, and an opposite closed end 16 defining a central aperture 18 therein. An elongated member, which in a preferred embodiment is a bolt 20 is provided and is sized for positioning within the sleeve 12. The bolt 20 includes an enlarged portion, which in a preferred embodiment is an angularly-shaped head 22 disposed at one end thereof. The bolt 20 also includes a threaded end 24 disposed at the end opposite the head 22. A plastic tube 26 is preferably provided and is sized for a close fit over the body of the bolt 20 yet readily fitting through the aperture 18. The plastic tube 26 functions as a slide bearing for the bolt 20 when the device is activated as described below.

The bolt 20 is positioned within the sleeve 12 so that the threaded end 24 passes through the aperture 18 at the closed end 16 of the sleeve 12. A radial aperture 28 is disposed through the sleeve 12 proximate the open-end 14 such that the head 22 is located within the sleeve 12 inwardly from the aperture 28. To introduce an axial load to the energy absorption device 10, a means for pulling on the first end of the tubular sleeve 12, consisting of a connecting member 30 which is sized and shaped for attachment to the open-end 14 of the sleeve 12 is provided. The connecting member 30 preferably includes an attachment rod 32 disposed within the sleeve 12 and an aperture 34 disposed in the rod 32 sized for alignment with the aperture 28 of the sleeve 12. A connecting pin 36 is sized and shaped to pass through the apertures 28 and 34 to securely attach the connecting member 30 to the sleeve 12. In preferred form the connecting member 30 includes a clevis 38, a connecting pin 40 and a cotter pin 42 which are adapted for connection to the terminal end of a cable loop or other mounting element.

The aperture 18 in the closed end 16 preferably has a diameter less than the diameter of the interior surface 44 of the sleeve 12. This creates an interior annular shoulder 46 which forms a stop member for the bolt head 22 as described below. Additionally, means for pulling on the elongated member are provided, which in preferred form include an eye-lug 48. The eye-lug 48 includes a base 49 having an aperture 50 sized and shaped for journaling about the threaded end 24 of the bolt 20. The base 49 includes a first side 51 which includes a surface 53, and as second side 55, also having a surface 57. The bolt 20 is adapted for sliding movement through the aperture 50. In order to determine the amount of axial preload, means for gaging the amount of axial load between the sleeve 12 and the bolt 20, a washer 52 is preferably positioned between the eye-lug 48 and the closed end 16 of the sleeve 12. In preferred form the threaded end 24 of the bolt 20 extends outwardly beyond the eye-lug's aperture 50 and is attached to an adjustable attachment member 54 preferably in the form of a locking nut. A resilient means, which is preferably embodied as a plurality of adjustable tension members 56 are positioned between the nut 54 and the end surface 58 of the eye-lug base 49. In preferred form, the adjustable tension members 56 are a plurality of bellville washers. Thus, as shown on FIG. 7, when a desired pretension load 100 is introduced between the tubular sleeve 12 and the elongated member, or bolt 12, the adjustable tension members 56, or resilient means, compress, creating a gap 102 between the tubular sleeve 12 and the base 49. The adjustment of the resilient means will allow creation of a gap 102 that will allow rotation of the washer 52 once a desired preload has been achieved.

The angularly-shaped bolt head 22 is preferably hexagonally-shaped so as to define a plurality of edges 60 which are spaced by a plurality of flat surfaces 62. It should be noted, however that the head 22 may be of any shape so long as a plurality of edges 60 are defined between a plurality of flat surfaces 62. The diameter of the bolt head 22 between opposite edges 60 is sized slightly greater than the diameter of the interior surface 44 of the tubular sleeve 12. The dimensions of the bolt head 22 between the opposite edges 60 are carefully sized relative to the diameter of the inner surface 44 such that when the bolt head 22 is drawn through the sleeve 12 during operation of the device 10 as described in greater detail below, the edges 60 cold work the material of the sleeve 12 by compression to thereby absorb energy. In preferred form, the sleeve 12 is constructed from 303 stainless steel while the bolt 20 and head 22 are constructed from 18-8 stainless steel. The eye-lug 48 is generally zinc or nickel plated forged steel.

In operation, the device 10 of the present invention includes opposite connecting members. The connecting member or clevis 30 is secured to a cable end in a manner well known to the art, while the eye-lug 48 is secured to a turnbuckle or other terminal point. When the two different cable assembly ends are pulled apart due to a fall as described below, the device 10 is put under substantial stress by a force 120, as shown on FIG. 6, and tends to be pulled apart. As the eye-lug 48 is pulled away from the sleeve 12, the bolt 20 and head 22 are pulled through the sleeve 12. As this occurs, the edges 60 of the head 22 are pressed against the inner surface 44. The head 22 does not peel steel from the surface 44, nor does it significantly deform the overall shape of the sleeve 12. The preferred configuration will cold-work a portion, the contact area, of the sleeve 12 as the edges 60 are compressed against the inner surface 44, and in so doing absorbs substantial energy. The pressure of the contact surface is controlled by the hollowed out, or softened, portion of the bolt head, allowing the hexagonal star of the bolt head to compress or reduce in diameter, allowing the head to be pulled through the tube at a constant force. In this manner, cold working of the metal parts is eliminated, eliminating the need for special lubricants or expensive advanced coating of the inner surface of the tube, as are required with known devices of this type. In addition, the device 10 of the present invention is substantially enclosed so that moisture does not tend to enter the interior of the sleeve 12 when the device 10 is exposed to the environment.

The device 10 of the present invention includes a feature not available on prior art devices. The present device 10 can be adjusted to create a high pretension of a pre-selected amount. In preferred form, the bellville washers 56 create 1000 to 1500 pounds of tension when the nut 54 is sufficiently tightened. The amount of pretension can be pre-selected by providing different numbers and sizes of washers 56, and thus controlling the amount of compression of each stack of washers. In preferred form, the energy absorbing device 10 of the present invention is capable of absorbing energy at approximately 12,000 inch-pounds of reactive force when the bolt head 22 is pulled entirely through the sleeve 12 until it impacts the shoulder stops 46. In preferred form, the nut 54 is first tightened to its maximum capability to create more than 1000 pounds of pre-tension in the device 10. Then the device is preloaded to 1000 pounds in a tensile test machine. Once set, the nut 54 is turned backward to slightly reduce some of the load. This permits the eye-lug 48 to slide forward, thus releasing the compression on the indicating washer 52, which by free rotation of the lug 48 indicates that the correct pre-tension has been achieved. This high pretension for the device 10 reduces the initial input energy of the fall in a fall arrest situation.

A highly preferred embodiment for the head 22' of the bolt 20 is illustrated in FIGS. 3 and 4. In this embodiment the head 22' is counter-bored to create a cavity 64. This cutout or reduced area of the cavity 64 serves as a means for reducing the rigidity of the head 22' by creating a substantially thinner annular edge 66 so that as the head 22' is pulled through the center of the sleeve 12, the annular edge 66 deforms and flexes so as to allow greater working tolerance between the edges 60 of the bolt head 22' and the interior surface 44 of the sleeve 12, and creating a constant pressure between the contact surfaces. Moreover, the circumferential surface 68 of the head 22' is preferably beveled so as to enhance the flexibility and energy absorption of the annular edge 66. It is important to note that it is contemplated that other means may be used for reducing the rigidity or stiffness of the head 221. For example it is contemplated that grooves or slots may be cut into the head 22'. Similarly, the head 22' may include cavities filled with a soft metal, such as copper, that will help dissipate heat, lubricate the head, and reduce the stiffness or rigidity, or flexible coatings may also be used.

Referring now to FIG. 5, the use of the device 10 of the present invention is illustrated. A block 70, which represents a person suspended by a vertical lifeline 72 from a connection point 74' is connected to a horizontal life line 76. The shock absorber device 10 interconnects the end 78 of the life line cable 76 to a turnbuckle 80 which is in turn secured to a terminal point 83. When the horizontal life line 76 is suspended with a minimal pre-tension (100 pounds or less), very little of the construction stretch is taken out of the line 76. Construction stretch is the amount a steel cable will stretch due to its winding, while material stretch is the elongation of the steel material when under a load. Steel cable is generally highly elastic up to about 90 percent of its structural strength. A ⅜ inch diameter horizontal life line cable 76 with a 12,500 ft. lb. ultimate strength will be highly elastic up to about 10,000–11,000 pounds of line tension. A typical fall arrest load 70 will impose about 3000 pounds of horizontal line tension. Steel cable stretch is like a spring, requiring very low forces for initial extension while resisting force increases and extension decreases as the fall cycle continues.

Using the present invention, an initial line pre-tension of about 1,000 pounds can reduce the total fall distance by as much as 50 percent in long spans (150 to 200 feet). When less energy is put into the system, less energy must be taken out by activation of the energy absorbing device 10. Thus, the final line tension is reduced by high initial pre-tensioning of the horizontal life line 76. The device 10 secured to the terminal point 83 via turnbuckle 80 provides the anchorage that must take both vertical and horizontal loads induced by line tension as a result of fall arrest forces.

Moreover, the load amplification factor due to low sag angles, is reduced by controllably elongating the line 76 under load. A short span between points 83 and 82 requires an energy absorbing device 10 which tends to absorb energy in a fall, since the cable 76 is typically about 30 feet in length and therefore not capable of absorbing much energy itself due to its short span and consequent limited ability to stretch far enough under load. In instances were there are multiple supports on a long cable length, the cable can absorb a considerable amount of energy itself. However, the cable elongates so much during initial loading that it in fact adds energy to the system by allowing additional free fall. Therefore, the energy absorption device 10 of the present invention permits tuning of the cable by pretensioning to cause it to absorb energy in a higher force range thus reducing the energy input into the system during a fall.

As can be seen from the above, the energy absorption device of the present invention is capable of absorbing energy in a fall arrest situation as well as keeping energy from entering the system by pre-tensioning the device of the invention. This pre-tensioning capability of the present invention significantly enhances the functioning of the energy absorption device. Moreover, the present invention is capable of absorbing significantly greater amounts of energy than prior devices over a shorter length by working in a higher energy range, thus, bulk and cost associated therewith is reduced utilizing the present aid invention. The present invention is also capable of tuning a horizontal life line cable to keep it from operating in the lower aim (below 850 lbs.) section of the cable's stretch range, for a system operating in the lower (high elongation to load) range will add more energy to the system by not sufficiently reducing the acceleration of the falling weight. In addition the present invention is capable of being utilized as both an in-line shock absorber or energy absorption device as well as a horizontal life line shock absorber or energy absorption device.

The foregoing description and the illustrative embodiments of the present invention have been described in detail in varying modifications and alternate embodiments. It should be understood, however, that the foregoing description of the present invention is exemplary only, and that the scope of the present invention is to be limited to the claims as interpreted in view of the prior art. Moreover, the invention illustratively disclosed herein suitably may be practiced in the absence of any element which is not specifically disclosed herein.

What is claimed is:

1. An energy absorber for absorbing energy transmitted by means of an axial load through a distance, the energy absorber comprising:

a generally rigid hollow tubular sleeve having a first end and a second end along an axis, the first end having an opening with an interior surface that extends from near the first end towards the second end, and the second end having an opening that is smaller than the opening in the first end;

an elongated member having a first end and a second end, the first end of the elongated member having an enlarged portion of a size that is slightly larger than the opening in the first end of said hollow tubular sleeve, the enlarged portion being an enlarged metal section of a rigidity that is less than the rigidity of the tubular sleeve, the enlarged metal section including a cutout section that reduces the rigidity of the enlarged portion and allows the enlarged metal section to flex away from the interior surface of said tubular sleeve, the second end of said elongated member being adapted for extending through the opening in the second end of said hollow tubular sleeve, so that when the axial load is applied between the first end of the hollow tubular sleeve and the second end of the elongated member the enlarged portion deforms into the opening in the second end of said hollow tubular sleeve and slides along the opening in said hollow tubular sleeve while producing an interference fit against the interior surface of the aperture in the first end of said hollow tubular sleeve to convert and dissipate the energy delivered through the axial load.

2. An energy absorber according to claim 1 and further comprising means for gaging a desired axial load between said tubular sleeve and said elongated member.

3. An energy absorber according to claim 2 wherein said means for gaging a desired axial load comprises:

means for pulling on the second end of the elongated member, the means for pulling on the elongated member being at a distance from the second end of said hollow tubular sleeve and outside the hollow tubular sleeve, the means for pulling on the second end further having a base with a first side having a surface facing the second end of the hollow tubular sleeve and a second side having a surface and an aperture adapted for slidingly accepting the second end of the elongated member;

a resilient means mounted between the second end of said elongated member and the surface on the second side of the means for pulling on the second end of the elongated member, said resilient means being connected to the second end of the elongated member and mounted against the surface on the second side of the means for pulling on the second end of the elongated member; and means for gaging a compressive load imposed on said resilient means.

4. An energy absorber according to claim 3 wherein said resilient means comprise bellville washers.

5. An energy absorber for absorbing energy transferred by a tension load in excess of a desired tension preload, the energy absorber comprising:

a generally rigid hollow tubular sleeve having a first end and a second end along an axis, the first end having an opening with an interior surface that extends from near the first end towards the second end, and the second end having an opening that is smaller than the opening in the first end; and an elongated member having a first end and a second end, the first end of the elongated member having an enlarged portion of a size that is slightly larger than the opening in the first end of said hollow tubular sleeve, the enlarged portion having a counterbore extending from the first end of the elongated member towards the second end of the elongated member, the counterbore reducing the rigidity of the enlarged portion to a rigidity that is less than the rigidity of the tubular sleeve, the second end of said elongated member being adapted for extending through the opening in the second end of said hollow tubular sleeve; and tension gaging means, so that the desired tension load can be introduced through the tubular sleeve and the elongated member, so that when the axial load is applied between the first end of the hollow tubular sleeve and the second end of the elongated member the enlarged portion deforms into the opening in the second end of said hollow tubular sleeve and slides along the opening in said hollow tubular sleeve while producing an interference fit against the interior surface of the aperture in the first end of said hollow tubular sleeve to convert and dissipate the energy delivered through the axial load.

6. An energy absorber according to claim 5 wherein the enlarged portion of said first end of the elongated member comprises a multi-faceted, angularly shaped head.

7. An energy absorber according to claim 6 further comprising at least one cutout portion.

8. An energy absorber according to claim 7 wherein said tension gaging means comprises:

means for pulling on the second end of the elongated member, the means for pulling on the elongated member being at a distance from the second end of said hollow tubular sleeve and outside the hollow tubular sleeve, the means for pulling on the second end further having a base with a first side having a surface facing the second end of the hollow tubular sleeve and a second side having a surface and an aperture adapted for slidingly accepting the second end of the elongated member;

a resilient means mounted between the second end of said elongated member and the surface on the second side of the means for pulling on the second end of the elongated member, said resilient means being connected to the second end of the elongated member and mounted against the surface on the second side of the means for pulling on the second end of the elongated member; and means for gaging a compressive load imposed on said resilient means.

9. An energy absorber according to claim 8 wherein said resilient means comprises bellville washers.

10. An energy absorber and tensioning means for absorbing energy transferred by a tension load, the energy absorber comprising:

a generally rigid hollow tubular sleeve having a first end and a second end along an axis, the first end having an opening with an interior surface that extends from near the first end towards the second end, and the second end having an opening that is smaller than the opening in the first end, the first end further having means for introducing a tension load to the hollow tubular sleeve;

an elongated member having a first end and a second end, the first end of the elongated member having an enlarged portion of a rigidity that is less than the rigidity of the hollow sleeve and being of a size that is slightly larger than the opening in the first end of said hollow tubular sleeve, the enlarged portion having a counterbore for reducing the rigidity of the enlarged portion, the second end of said elongated member being adapted for extending through the opening in the second end of said hollow tubular sleeve and having means for pulling on the second end of the elongated member, the means for pulling on the second end of the elongated member being at a distance from the second end of said hollow tubular sleeve and outside the hollow tubular sleeve, the means for pulling on the second-end having a base with a first side having a surface facing the second end of the hollow tubular sleeve and a second side having a surface and an aperture adapted for slidingly accepting the second end of the elongated member;

a resilient means mounted between the second end of said elongated member and the surface on the second side of the means for pulling on the second end of the elongated member, said resilient means being connected to the second end of the elongated member and mounted against the surface on the second side of the means for pulling on the second end of the elongated member; and means for gaging a compressive load on said resilient means, so that a desired load introduced to said resilient means through the elongated member and the tubular sleeve can be measured, and so that when the predetermined axial load is applied between the first end of the hollow tubular sleeve and the second end of the elongated member the enlarged portion deforms into the opening in the second end of said hollow tubular sleeve and slides along the opening in said hollow tubular sleeve while producing an interference fit against the interior surface of the aperture in the first end of said hollow tubular sleeve.

11. An energy absorber according to claim 10 wherein said elongated member comprises a bolt having a head on the first end and a threaded section on the second end.

12. An energy absorber according to claim 11 wherein said resilient means comprise at least one bellville washer.

* * * * *